(12) United States Patent
Fels

(10) Patent No.: US 11,375,657 B2
(45) Date of Patent: Jul. 5, 2022

(54) FURROW CUTTING AND PRESS WHEEL ASSEMBLY WITH ADJACENT SEEDING UNIT

(71) Applicant: MYGRAIN SOLUTIONS PTY LTD, Neridup (AU)

(72) Inventor: Michael Fels, Esperance (AU)

(73) Assignee: MYGRAIN SOLUTION PTY LTD, Neridup (AU)

( * ) Notice: Subject to any disclaimer, the term of this patent is extended or adjusted under 35 U.S.C. 154(b) by 431 days.

(21) Appl. No.: 15/998,724

(22) PCT Filed: Feb. 16, 2017

(86) PCT No.: PCT/AU2017/050138
§ 371 (c)(1),
(2) Date: Aug. 16, 2018

(87) PCT Pub. No.: WO2017/139848
PCT Pub. Date: Aug. 24, 2017

(65) Prior Publication Data
US 2019/0246553 A1 Aug. 15, 2019

(30) Foreign Application Priority Data
Feb. 16, 2016 (AU) ................................ 2016900544

(51) Int. Cl.
*A01C 7/20* (2006.01)
*A01C 5/06* (2006.01)
(Continued)

(52) U.S. Cl.
CPC .............. *A01C 7/201* (2013.01); *A01C 5/064* (2013.01); *A01B 15/16* (2013.01); *A01B 23/06* (2013.01); *A01C 7/06* (2013.01)

(58) Field of Classification Search
CPC ......... A01C 5/064; A01C 7/201; A01B 15/16; A01B 23/06
See application file for complete search history.

(56) References Cited

U.S. PATENT DOCUMENTS 1,056,386 A * 3/1913 Wheeler ................ A01C 5/064
111/168
1,262,283 A * 4/1918 Sturrock ................ A01C 5/064
111/168

(Continued)

FOREIGN PATENT DOCUMENTS

| AU | 2013211477 A1 | 8/2013 |
| EP | 1774844 A2 | 4/2007 |

(Continued)

OTHER PUBLICATIONS

International Search Report and Written Opinion dated May 15, 2017 from International Application No. PCT/AU2017/050138, 17 pages.

*Primary Examiner* — Alicia Torres
(74) *Attorney, Agent, or Firm* — MH2 Technology Law Group, LLP

(57) ABSTRACT

A seeding apparatus comprising a frame having a first section adapted to be attached to a toolbar for towing by a vehicle, and a second section comprising a cutting unit and a seeding unit, the cutting unit comprising at least one cutting disc and the seeding unit comprising at least one seed boot and at least one seed boot mounting, the seed boot mounting comprising a bar configured to locate the seed boot adjacent a side surface of the cutting disc, wherein the bar comprises a proximal end attached to the frame of the seeding apparatus, and a distal end for attachment of the seed boot. The invention also relates to a cutting and seeding assembly for mounting on the seeding apparatus.

29 Claims, 12 Drawing Sheets

(51) Int. Cl.
  *A01B 15/16*   (2006.01)
  *A01B 23/06*   (2006.01)
  *A01C 7/06*   (2006.01)

(56) References Cited

U.S. PATENT DOCUMENTS

| | | | |
|---|---|---|---|
| 4,031,834 A * | 6/1977 | Klenke | A01C 7/205 |
| | | | 111/195 |
| 4,141,302 A | 2/1979 | Morrison, Jr. et al. | |
| 5,802,995 A * | 9/1998 | Baugher | A01C 5/068 |
| | | | 111/140 |
| 6,216,616 B1 * | 4/2001 | Bourgault | A01C 5/064 |
| | | | 111/186 |
| 7,357,193 B2 * | 4/2008 | Harmon | A01B 23/06 |
| | | | 172/566 |
| 2002/0038620 A1 * | 4/2002 | Gentilhomme | A01B 35/28 |
| | | | 111/166 |
| 2011/0120357 A1 | 5/2011 | Schilling et al. | |
| 2015/0319915 A1 * | 11/2015 | Pfitzner | A01C 5/062 |
| | | | 111/163 |

FOREIGN PATENT DOCUMENTS

| | | |
|---|---|---|
| EP | 2210463 A1 | 7/2010 |
| GB | 190927546 | 3/1910 |
| GB | 2011236 A | 7/1979 |
| WO | 1981/001093 A1 | 4/1981 |
| WO | 2010/091469 A2 | 8/2010 |
| WO | 2014/105560 A2 | 7/2013 |

* cited by examiner

FURROW CUTTING AND PRESS WHEEL ASSEMBLY WITH ADJACENT SEEDING UNIT

CROSS-REFERENCE TO RELATED APPLICATIONS

This application is a U.S. National Stage application of PCT/AU2017/050138 filed 16 Feb. 2017, which claims priority to Australian Application No. 2016900544 filed 16 Feb. 2016, the entire disclosures of which are hereby incorporated by reference in their entireties.

TECHNICAL FIELD

The present invention relates to agricultural apparatus.

The invention has been devised particularly, although not necessarily solely, in relation to seeding apparatus.

BACKGROUND ART

The following discussion of the background art is intended to facilitate an understanding of the present invention only. The discussion is not an acknowledgement or admission that any of the material referred to is or was part of the common general knowledge as at the priority date of the application.

Seeding apparatus comprise furrow cutting and seeding units that typically are hauled across a field to plant multiple seed rows simultaneously.

The furrow cutting and seeding units when hauled across the field displace soil to create a seed furrow, deposit seeds within the furrow, and close the furrow by moving the displaced soil back into the furrow.

Two examples of seeding apparatus using different type of instruments for defining the furrows that will contain seeds are: a first type of seeding apparatus using tines (similar to hoes) for pulling through the soil to define the furrows and a second type of seeding apparatus uses are rotating discs.

Much of the following comparison is in relation to disc seeding machines.

Typically, the furrow cutting units comprise a disc for opening of the soil. The conventional discs are generally flat disc having even side surfaces and a relatively sharp edge for cutting the soil to form the furrow. As the furrow is formed the seed and fertiliser is inserted in the furrow.

There are two common options on how the seeds and fertilizer is delivered to the seeding units for deposition into the furrow. A first option is where the seed and/or fertiliser is delivered to the seeding units from a separate machine via tubes.

A second option uses the use of reservoirs holding the seeds and fertilisers. In this particular option, the seeding units may comprise reservoirs for storing the seeds and tubes for delivering the seeds and/or fertiliser from the reservoir into the furrow through a seed boot. In this second option the tubes have an end attached to the reservoir and an opposite end attached to the seed boot; in the first option would be attached to the separate machine.

The seed boot is located adjacent the disc. The fact that the seed boot is located adjacent the disc directs the seeds to fall into the furrow.

The seed boot has three main roles. Firstly, it holds the furrow open, ready for the seed/fertiliser to be placed into the prepared furrow. Secondly, as described, it delivers the seed into the furrow. The third role is as a scraper for the disc, to keep the disc clean and prevent soil and crop material entering the furrow between the seed boot and the disc. The following discussion refers to the role of the seed boot of a scraper of the disc.

As mentioned before, the seed boot is located adjacent the disc; the fact that the seed boot is located adjacent the disc provides a gap between the seed boot and the disc. The presence of the gap typically permits debris to get trapped between the seed boot (or simply called boot) and the disc. The trapped debris may prevent the disc from rotating thus reducing the cutting action of the disc and resulting in the eventual blocking of the seeding machine with crop residues and soil. This is detrimental to operation of the seeding apparatus.

Also, conventional arrangements may include rigid mounted boots or pivoting boots. With rigid boots, excess pressure against the disc results in the disc stalling, in which case a narrow gap (formed between the disc and the boot) is required to avoid the stalling of the disc. However, under certain conditions residues and soil may become trapped in the narrow gap between the boot and the disc causing the disc to stop rotating.

Referring now to pivotal boots, typically pivoting boots rotate about an axis that is proximal to the boot, resulting in the portion of the boot aligned with its rotational axis being unable to move away from the disc which can result in blockages. One version of the pivoting style of boots is configured such that only the rear seed tube end of the boot is able to rotate away from the disc, resulting in material being carried around on the disc in certain conditions and deposited onto the pivot point which is static relative to the disc, which also can result in the disc stopping. In an alternative typical arrangement of pivoting boots, only the scraper (leading) edge of the boot is able to rotate away from the disc, resulting in blockages between the pivot point near the rear of the boot (seed tube), which is static relative to the disc, and the disc.

Further, the depth of the furrow formed by the cutting disc is mainly defined by the depth that the cutting disc is located with respect to the soil surface. In conventional seeding apparatus, the depth of the disc is set by a gauge wheel running alongside the disc to set the depth of the disc. A disadvantage of the conventional gauge wheels is that they set the depth relative to the undisturbed soil adjacent to the disc. If there is a high point adjacent to the location of the disc, the disc will be lifted by the gauge wheel resulting in shallow seed placement.

Furthermore, the presence of the gauge wheel forms mud blockages; one of the reasons is that the presence of a gauge wheel on conventional units prevents the soil from being thrown away from the disc.—mud blockages are a major problem for the conventional seeding apparatus. Also, having a gauge wheel adds additional components that may be prone to wear and tear on a regular basis. Further, in uneven soils a gauge wheel does not permit proper seed depth control.

Moreover, it is known that narrow row spacing improves greatly crop yields. Also, narrow row spacing improves weed control; this is because of the increased crop competition that is generated due to the narrow row spacing, and the increased interception of sunlight by crop plants thus reducing the access to sunlight by weeds.

However, narrow row spacing typically is difficult to accomplish in conventional seeding apparatus. With conventional tine seeders, the closeness of the tines required for narrow row spacing can result in crop residues blocking the machine. With conventional disc seeding apparatus the cutting and seeding units are relatively bulky and therefore cannot be located side by side at a narrow row. In contrast, conventional seeding apparatus require arranging the cutting and seeding units into two or more rows to accommodate narrow row spacing because the cutting and seeding units are too bulky to fit side by side. This effectively precludes the option of building a wide machine (24 m or wider) as these seeding apparatus, owing to their large mass, must fold forwards or backwards (as opposed to upwards as occurs with smaller lighter machines) Conventional units are also typically very complex and therefore expensive which means accomplishing narrow row spacing becomes prohibitively expensive.

Further, the cutting discs of conventional seeding units include flat cutting discs having even side surfaces. Flat discs can become blunt relatively quickly. One of the disadvantages of a blunt cutting disc is that it produces "hairpinning". Hairpinning is caused when a blunt disc pushes surface straw, chemical and residue into the furrow. Hairpinning is detrimental to the seeding process because it results in poor seed-soil contact and entrained chemical damage to seedlings and consequently poor crop establishment. Another disadvantage of flat discs is that they generate low driving forces between the smooth flat surfaces and the soil, resulting in stalling of the disc in some conditions.

It is against this background that the present invention has been developed.

SUMMARY OF INVENTION

According to a first aspect of the invention there is provided a seeding apparatus comprising a frame having a first section adapted to be attached to a toolbar for towing by a vehicle, and a second section comprising a cutting unit and a seeding unit, the cutting unit comprising at least one cutting disc and the seeding unit comprising at least one seed boot and at least one seed boot mounting, the seed boot mounting comprising a bar configured to locate the seed boot adjacent a side surface of the cutting disc, wherein the bar comprises a proximal end attached to the first section of the frame of the seeding apparatus, and a distal end for attachment of the seed boot.

Preferably, the attachment between the proximal end of the bar and the frame of the seeding apparatus is adapted to allow selective displacement of the seed boot between a location separated from the cutting disc and a location adjacent the cutting disc.

Preferably, the proximal end of the bar is pivotally attached to the first section of the frame of the seeding apparatus to allow selective displacement of the seed boot between a location separated from the cutting disc and a location adjacent the cutting disc.

Preferably, the seeding apparatus comprises a pivot joint for pivotally attaching the proximal end of the bar to the location of the first section of the frame of the seeding apparatus.

Preferably, the pivot joint is biased in such a manner that the first seed boot is maintained adjacent the side surface of the cutting disc unless a force is applied to the first seed boot to separate the first seed boot from the side surface of the disc.

Preferably, the pivot joint is adapted to permit lateral and vertical movement of the bar.

Preferably, the pivot joint comprises the torsional spring means.

Preferably, the torsional spring means comprise a flexible material.

Preferably, the flexible material comprises rubber.

In an alternative arrangement, the bar is adapted to allow selective displacement of the seed boot between a location separated from the cutting disc and a location adjacent the cutting disc.

Preferably, the distal end of the bar comprises a scraper for attachment of the seed boot to the bar.

In an arrangement, the seed boot mounting comprises the scraper.

Preferably, the seed boot comprises a seed tube for delivery of the seed.

Preferably, the seed tube is attached to the scraper.

Preferably, the scraper is attached to the distal end of the bar in such a manner that a portion of the scraper abuts the side surface of the cutting disc for scraping of the side surface during rotation of the cutting disc.

Preferably, the seed boot comprises an upper end adapted to receive the seeds and a lower end configured to deliver the seeds passing through the seed boot into a furrow formed by the cutting disc.

Preferably, the lower end of the seed boot comprises a deflecting plate for directing the seeds into the furrow.

Preferably, the seed boot comprises a rearward sloping leading edge and/or wing member for assisting in the removal of any residue from the furrow and for opening a wider slot for the seed thereby effectively reducing the row spacing even further.

Preferably, the wing member is attached to a lower end of the seed boot and extending perpendicularly thereto.

Preferably, the cutting disc is running at a particular angle to the direction of travel.

Preferably, the particular angle is within a range of between 5 and 9 degrees.

In a particular arrangement, the particular angle is seven degrees.

Preferably, the seeding apparatus comprises two cutting units and two seeding units; in particular, there are a first cutting unit and a first seeding unit, and a second cutting unit and a second seeding unit, Preferably, the first cutting unit comprises a first cutting disc and the first seeding unit comprising a first seed boot and a first seed boot mounting.

Preferably, the second cutting unit comprises a second cutting disc and the second seeding unit comprising a second seed boot and a second seed boot mounting.

Preferably, the first seed boot of the first seeding unit is located adjacent the outer side surface of the first cutting disc. (The outer side surface of the cutting disc is the surface of the disc that faces away from the hub onto which the disc is rotatably attached)

Preferably, the second seed boot of the first seeding unit is located adjacent the inner side surface of the second cutting disc. (The inner side surface of the cutting disc is the surface of the disc that faces towards the hub onto which the disc is rotatably attached)

Preferably, the first cutting unit and first seeding unit, and the second cutting unit and second seeding unit are located side by side. This arrangement is particularly useful because it permits narrow row spacing and is more cost effective.

Preferably, the spacing between cutting discs is between 180 mm to 310 mm

Preferably, each of the cutting discs is rotatably attached to an individual hub.

Preferably, the first cutting unit and the first seeding unit, and the first wheel of the press wheel assembly are arranged in a tandem arrangement.

Preferably, the second cutting unit and the second seeding unit, and the second wheel of the press wheel assembly are arranged in a tandem arrangement.

Preferably, the second seed boot mounting comprises another bar comprising a proximal end attached to a second location of the frame of the seeding apparatus and a distal end for attachment of the second seed boot.

Preferably, the second seed boot of the second seeding unit is located adjacent the inner side surface of the second cutting disc. (The inner side surface of the cutting disc is the surface of the disc that faces towards the hub onto which the disc is rotatably attached)

Preferably, the proximal end of the another bar is pivotally attached to the second location of the front section of the seeding apparatus to allow selective displacement of the second seed boot between a location separated from the second cutting disc and a location adjacent the second cutting disc.

Preferably, the seeding apparatus comprises a pivot joint for pivotally attaching the proximal end of the another bar to the second location of the front section of the seeding apparatus.

Preferably, the pivot joint is biased in such a manner that the second seed boot is maintained adjacent the side surface of the second cutting disc unless a force is applied to the second seed boot to separate the second seed boot from the inner side surface of the second cutting disc.

In an alternative arrangement, the another bar is adapted to allow selective displacement of the seed boot between a location separated from the cutting disc and a location adjacent the cutting disc Preferably, the distal end of the another bar comprises a scraper for attachment of the second seed boot to the distal end of the second bar.

Preferably, the scraper is attached to the distal end of the another bar in such a manner that a portion of the scraper abuts the side surface of the second cutting disc for scraping of the side surface during rotation of the second cutting disc.

Preferably, the second seed boot comprises an upper end adapted to receive the seeds and a lower end configured to deliver the seeds passing through the second seed boot into the furrow formed by the second cutting disc.

Preferably, the lower end of the second seed boot comprises a deflecting plate for directing the seeds into the furrow.

Preferably, the first and second cutting discs comprises rippled cutting discs.

Preferably, the seeding apparatus further comprises a press wheel assembly attached to the second section of the seeding apparatus.

Preferably, the rear section of the seeding apparatus is adapted to attach the press wheel assembly in such a manner that the height of the press wheel assembly with respect to the height of the disc may be varied. This arrangement is particularly useful because it permits varying the depth of the cutting disc within the soil by adjusting the height of the press wheel assembly relative to the disc.

Preferably, the cutting unit and the seeding unit, and the press wheel assembly are arranged in a tandem arrangement. The fact that the cutting unit is arranged in tandem arrangement with respect to the press wheel assembly is particularly advantageous because it permits the wheel(s) (of the press wheel assembly) to run in the slot created by the cutting unit (including the disc) and in direct line with the cutting unit disc. The advantage of this particular arrangement is that if the soil comprises a high point (such as protrusion in the soil), the disc of the cutting unit cuts straight through the soil without the cutting unit being lifted; this permits displacing sideways of the high point leaving an open and level furrow which the press wheel then passes through without rising as the high point has been removed by the disc. The result is more consistent seed depth.

Preferably, the press wheel assembly comprises a first wheel and a second wheel located side by side.

Preferably, the first wheel and the first cutting unit and the first seeding unit are arranged in a tandem relationship.

Preferably, the first wheel and the first cutting unit and the second seeding unit are arranged in a tandem relationship.

Preferably, the seeding apparatus comprises a height adjustment mechanism for selectively varying the height of the press wheel assembly.

Preferably, the height adjustment mechanism comprises a sleeve for attachment to the rear section of the frame of the seeding apparatus, and a rod comprising a first end adapted to be slideably received within the sleeve, and a second end adapted to attached the first wheel and a second wheel.

Preferably, the sleeve is adapted to fasten the first end of the rod at particular locations along the length of the sleeve to form a furrow of a particular depth by securing the rod at a particular location along the length of the sleeve.

In an alternative arrangement, the press wheel assembly comprises a swing arm and a wheel attached to the swing arm, the swing arm being pivotally attached to the rear section of the frame of the seeding apparatus.

Preferably, the rear section comprises a plate for pivotally attaching the swing arm, the plate being adapted to secure the swing arm at particular locations of the plate Preferably, the plate comprises a plurality of holes arranged in a spaced apart relationship with respect to each other for attachment of the swing arm at particular locations of the plate to vary the location of the swing arm with respect to the plate in order to set the depth of the seeds.

According to a second aspect of the invention there is provided a cutting and seeding assembly for mounting on a seeding apparatus comprising a frame having a first section adapted to be attached to a toolbar for towing by a vehicle, and a second section adapted to receive the cutting and seeding assembly, the cutting and seeding assembly comprising a cutting unit and a seeding unit, the cutting unit comprising a cutting disc adapted to be rotatably attached to the frame of the seeding apparatus and the seeding unit comprising a seed boot and a seed boot mounting, the seed boot mounting comprising a bar configured to locate the seed boot adjacent a side surface of the cutting disc, wherein the bar comprises a proximal end being adapted to be attached to the first section of the frame of the seeding apparatus, and a distal end for attachment of the seed boot.

Preferably, the proximal end of the bar is adapted to be pivotally attached to the location of the first section of the frame of the seeding apparatus to allow selective displacement of the seed boot between a location separated from the cutting disc and a location adjacent the cutting disc.

Preferably, the pivot joint is adapted to permit lateral and vertical movement of the bar.

In an alternative arrangement, the bar is adapted to allow selective displacement of the seed boot between a location separated from the cutting disc and a location adjacent the cutting disc.

Preferably, the distal end of the bar comprises a scraper for attachment of the seed boot to the bar.

Preferably, the scraper is attached to the distal end of the bar in such a manner that a portion of the scraper abuts the side surface of the cutting disc for scraping of the side surface during rotation of the first cutting disc.

Preferably, the seed boot comprises a wing member for assisting in the removal of any residue from the furrow and for opening a wider slot for the seed thereby effectively reducing the row spacing even further.

Preferably, the wing member is attached to a lower end of the seed boot and extending perpendicularly thereto.

According to a third aspect of the invention there is provided a seeding apparatus having a frame comprising a first section adapted to be attached to a toolbar for towing by a vehicle, and a second section adapted to receive a press wheel assembly in such a manner that the height of the press wheel assembly with respect to the disc may be varied, thereby governing the cutting and consequently seeding depth of the disc relative to the surface of the furrows into which the seeds are placed.

Preferably, the press wheel assembly comprises a first wheel and a second wheel located side by side.

Preferably, the seeding apparatus comprises a height adjustment mechanism for selectively varying the height of the press wheel assembly.

Preferably, the height adjustment mechanism comprises a sleeve for attachment to the rear section of the frame of the seeding apparatus, and a rod comprising a first end adapted to be slideably received within the sleeve and a second end adapted to attached the first wheel and a second wheel.

Preferably, the sleeve is adapted to fasten the first end of the rod at particular locations along the length of the sleeve to form a furrow of a particular depth by securing the rod at a particular location along the length of the sleeve.

In an alternative arrangement, the press wheel assembly comprises a plurality of swing arms being pivotally attached to the rear section of the frame of the seeding apparatus, and a plurality of wheels, each of the wheels being rotatably attached to one of the swing arms.

Preferably, the second section of the frame comprises a plurality of plates for pivotally attaching the swing arms, each particular plate being adapted to secure a particular swing arm at particular locations of the particular plate.

Preferably, each plate comprises a plurality of holes arranged in a spaced apart relationship with respect to each other for attachment the particular swing arm at particular locations of the particular plate to vary the location of the particular swing arm with respect to the plate in order to set the depth of the furrow.

According to a fourth aspect of the invention there is provided a cutting disc for rotatably attachment to a seeding apparatus, the cutting disc comprising a plurality of ripples that are arranged in a spaced apart relationship around the outer side of the cutting disc and each of the ripples extending at least partially from the outer circumference of the disc radially towards the center of the disc defining an exterior periphery.

Preferably, a particular arrangement of the cutting disc comprises an outer diameter of about 460 mm, an exterior periphery having a width of about 80 mm, wherein the exterior periphery comprises ripples having each ripple a height of about 6 mm.

According to a fifth aspect of the invention there is provided a pivot joint comprising torsional spring means.

Preferably, the torsional spring means comprise a flexible material.

Preferably, the flexible material comprises rubber.

According to a sixth aspect of the invention there is provided a seeding apparatus comprising a frame having a first section adapted to be attached to a toolbar for towing by a vehicle and a second section comprising a cutting unit comprising a plurality of cutting discs, wherein the cutting discs are located side by side.

Preferably, the spacing between cutting discs is between 180 mm to 310 mm.

Preferably, each of the cutting discs is rotatably attached to an individual hub that is attached to the second section of the frame of the seeding apparatus.

Preferably, the cutting discs are running at a particular angle to the direction of travel.

Preferably, the particular angle is within a range of between 5 and 9 degrees.

In a particular arrangement, the particular angle is seven degrees.

Preferably, the cutting discs comprise rippled cutting discs.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

(The above description of the drawings describe the seeding apparatus when seen from the rear section of the seeding apparatus towards the front section of the seeding apparatus)

DESCRIPTION OF EMBODIMENT(S)

FIGS. 1 to 8 show a particular arrangement of a seeding apparatus 10 in accordance with a first embodiment of the invention; in particular FIGS. 1 to 8 depict a right hand seeding apparatus 10; however, the seeding apparatus shown in FIGS. 1 to 8 may also be configured as a left hand seeding apparatus 10 which figures would be mirror images of FIGS. 1 to 8.

Seeders may include a toolbar comprising a plurality of right hand seeding apparatus 10 and a plurality of left hand seeding apparatus 10; in particular, typically seeders have an equal number of right hand and left hand seeding apparatus 10 to ensure that the toolbar tracks straight.

Figure 1:
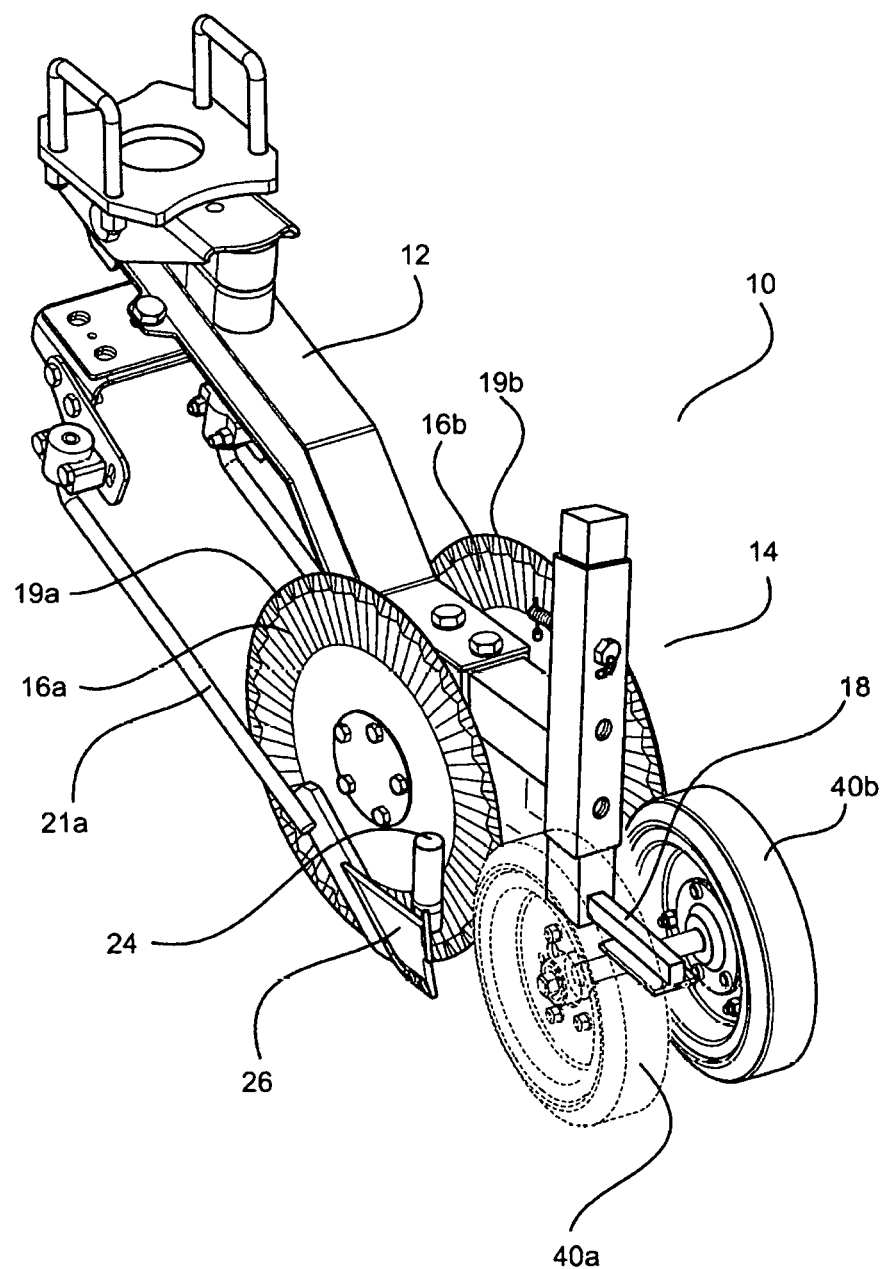
FIG. 1 is a perspective left side view depicting a rear section of a right side seeding apparatus according to a first embodiment of the invention.

Referring to FIG. 1, the seeding apparatus 10 comprises a frame 11 having a front section 12 (the first section) and a rear section 14 (the second section). The front section 12 is adapted to be attached to the toolbar to be pulled by a towing vehicle.

The rear section 14 comprises cutting and seeding assemblies 16 and a trailing press wheel assembly 18. The cutting and seeding assemblies 16 and the trailing press wheel assembly 18 are arranged in tandem arrangement. This arrangement allows the seeding apparatus 10 to be hauled over a field for forming a furrow, and closing the furrow by the trailing press wheel assembly 18 after deposition of the seeds within the furrow.

Figure 2:
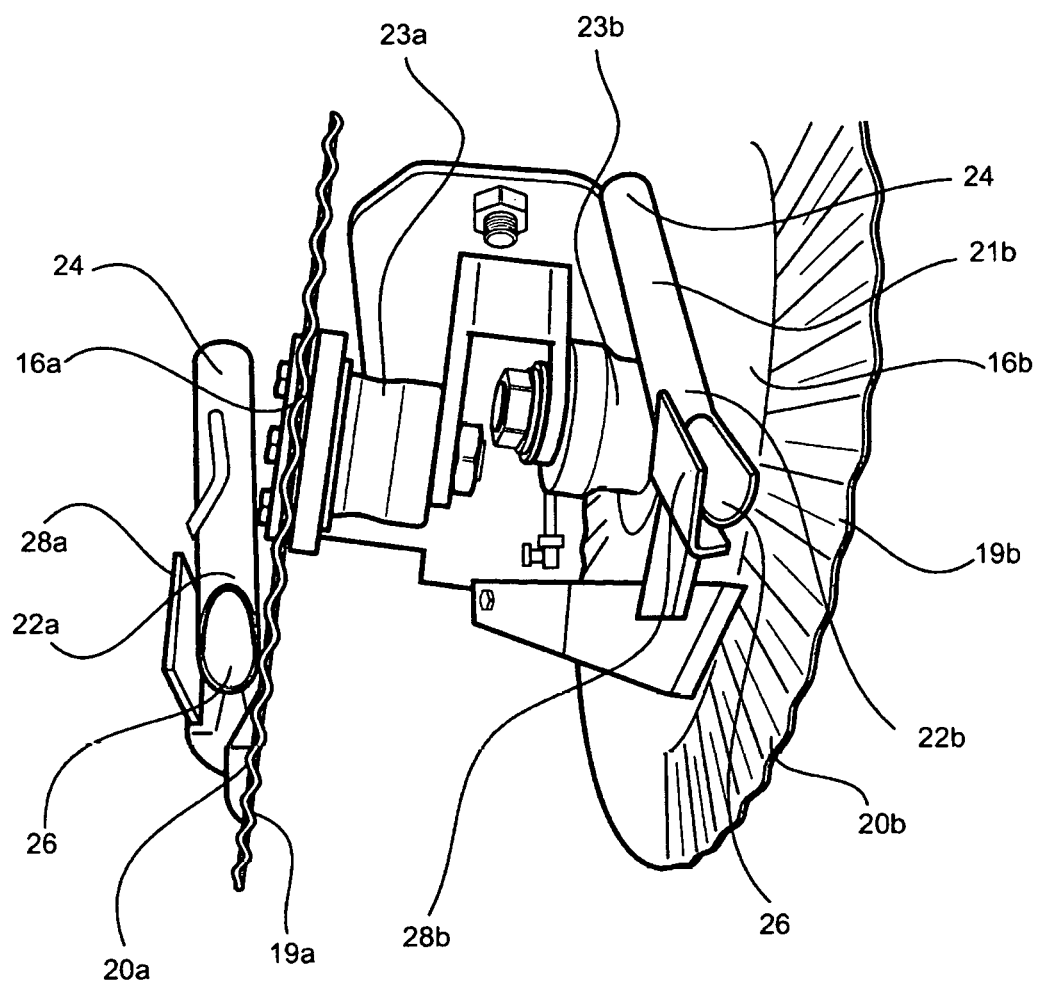
FIG. 2 is a perspective bottom rear view of the seeding apparatus shown in FIG. 1 depicting left and right side cutting and seeding assemblies according to the first embodiment of the invention.

Referring now to FIG. 2, FIG. 2 depicts a particular arrangement of the cutting and seeding assemblies 16 in accordance with the first embodiment of the invention.

In the particular arrangement shown in FIG. 2, the seeding apparatus 10 comprises a first cutting and seeding assembly 16a and a second cutting and seeding assembly 16b; in particular, when the seeding apparatus 10 is being viewed from its rear section 14 towards its front section 12, the first cutting and seeding assembly 16a is located at the left side of the seeding apparatus 10 and the second cutting and seeding assembly 16b is located at the right hand side of the seeding apparatus 10.

As can be appreciated from the figures, the cutting and seeding assemblies 16a and 16b are located side by side. This particular arrangement is particularly advantageous because it allows the formation of narrow row spacing that reduces the complexity and maintenance as well as being more cost effective. It is known that narrow row spacing has been proven to substantially improve crop yields; weed control is also improved because of the increased crop competition due to the narrow row spacing. Further, one other important advantage of having the side by side arrangement compared to two rows. With all of the seeding assemblies configured in one straight line, the soil throw from each disc into the next disc is identical. With two row machines, the rear row of units can shift the soil sideways enough that it interferes with the front row of furrows, particularly by resulting in an increase in the effective seeding depth, and chemical toxicity in the front rows. With our single row design every furrow on the machine is effectively identical.

As shown in for example FIG. 2, each of the cutting and seeding assemblies 16 comprises a cutting unit 19 having a cutting disc 20, and a seeding unit 21 having a seed boot 22; in particular, when the seeding apparatus is seen from its rear section 14 towards its front section 10 there is a left cutting unit 19a located at the left side of the seeding apparatus 10 and there is a right hand side cutting unit 19b located at the right side of the seeding apparatus 10.

The cutting discs 20 are rotatably attached to the rear section 14 of the seeding apparatus 10. In this manner, the discs 20 rotate during towing of the seeding apparatus 10 across the field for cutting of the soil to define the furrow.

In the particular arrangement shown in FIG. 2, each of the cutting discs 20a and 20b are, respectively, attached to hub assembly 23a and 23b. In particular, there is (1) a left side cutting disc 20a having a surface facing away from the hub assembly 23a (also referred to as the outer surface of the cutting disc) and a surface facing to the hub assembly 23a (also referred to as the inner surface of the cutting disc) and (2) a right side cutting disc 20b having a surface facing away from the hub assembly 23b (also referred to as the outer surface of the cutting disc) and a surface facing to hub assembly 23b (also referred to as the inner surface of the cutting disc)

It is particular advantageous that the cutting discs 30 are rotatably attached to the rear section 14 through separate hub assemblies 23a and 23b. Using separate hub assemblies 23 for each disc allows the axes of the discs to be in line across the width of the machine, resulting in a consistent seedbed.

Furthermore, in particular arrangements the discs 20 are running at angle having a value of between five to nine degrees with respect to the direction of travel; in particular, in an arrangement the discs are running at an angle of seven degrees to the direction of travel. The fact that the discs run at an angle with respect to the direction of travel is particularly advantageous because it opens a slot in which the seed may be placed by placing the soil to one side and creating a narrow furrow.

Each of the seed boots 22 are disposed adjacent the cutting discs 20. The seed boot 22a of the left cutting unit 19a is located adjacent the outer side of the disc 20a. The seed boot 22b of the right cutting unit 19b is located adjacent the inner side of the cutting disc 20b.

Further, each seed boot 22 comprises an upper end 24 and a lower end 26. The upper end 24 is adapted to be connected to seed and fertiliser reservoirs or a hose from a separate machine delivering the seed and the fertiliser, and the lower end 26 is configured to deliver the seeds (and fertilisers) passing through the seed boot 22 into the furrow. In the particular arrangement shown in the figures, the lower end 26 of each seed boot 22 comprises a deflecting plate 28 for directing the seeds into the respective furrow.

Figure 3:
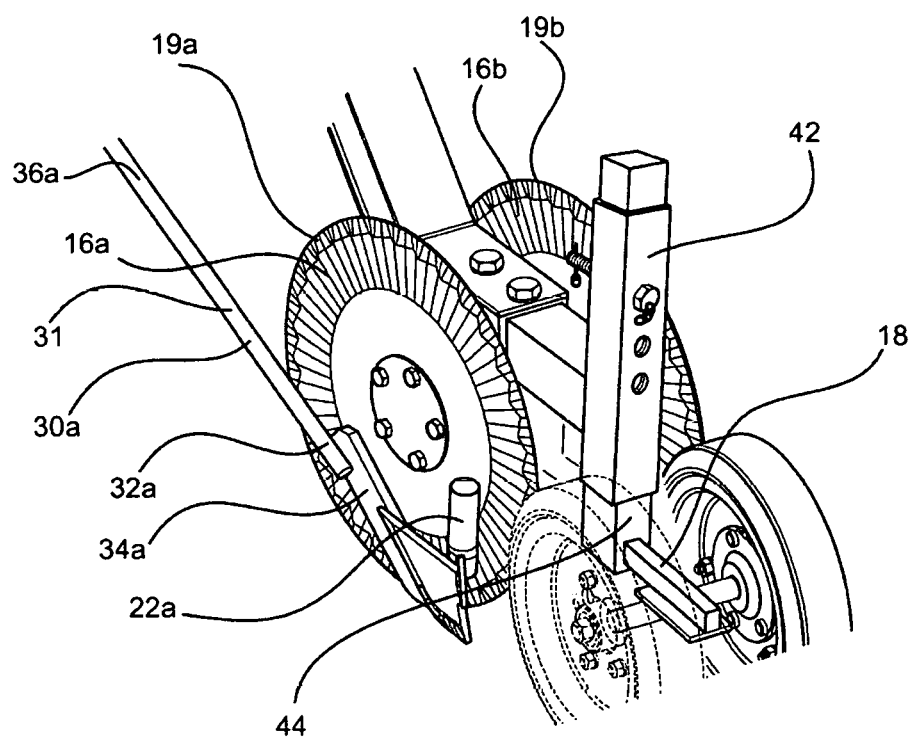
FIG. 3 is a perspective top rear view of the seeding apparatus shown in FIG. 1 depicting the left side cutting and seeding assembly according to the first embodiment of the invention.
Figure 4:
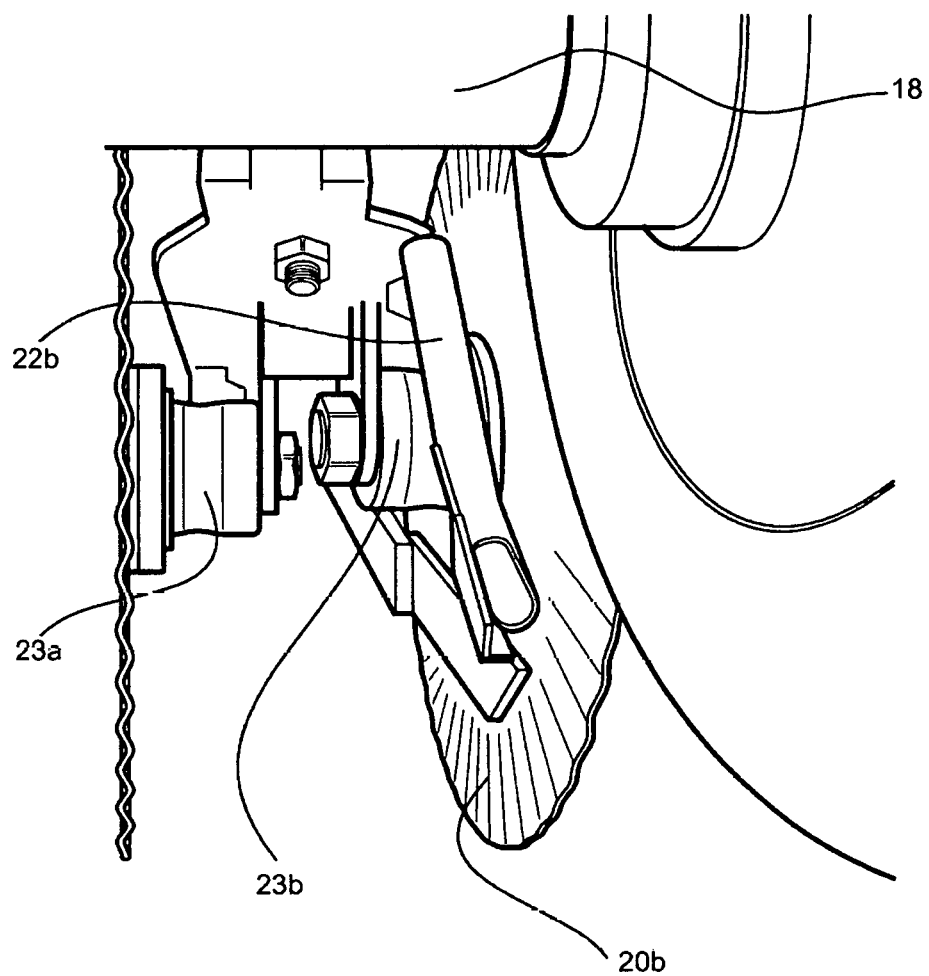
FIG. 4 is a perspective rear view of the seeding apparatus shown in FIG. 1 depicting the right side cutting and seeding assembly according to the first embodiment of the invention.
Figure 5:
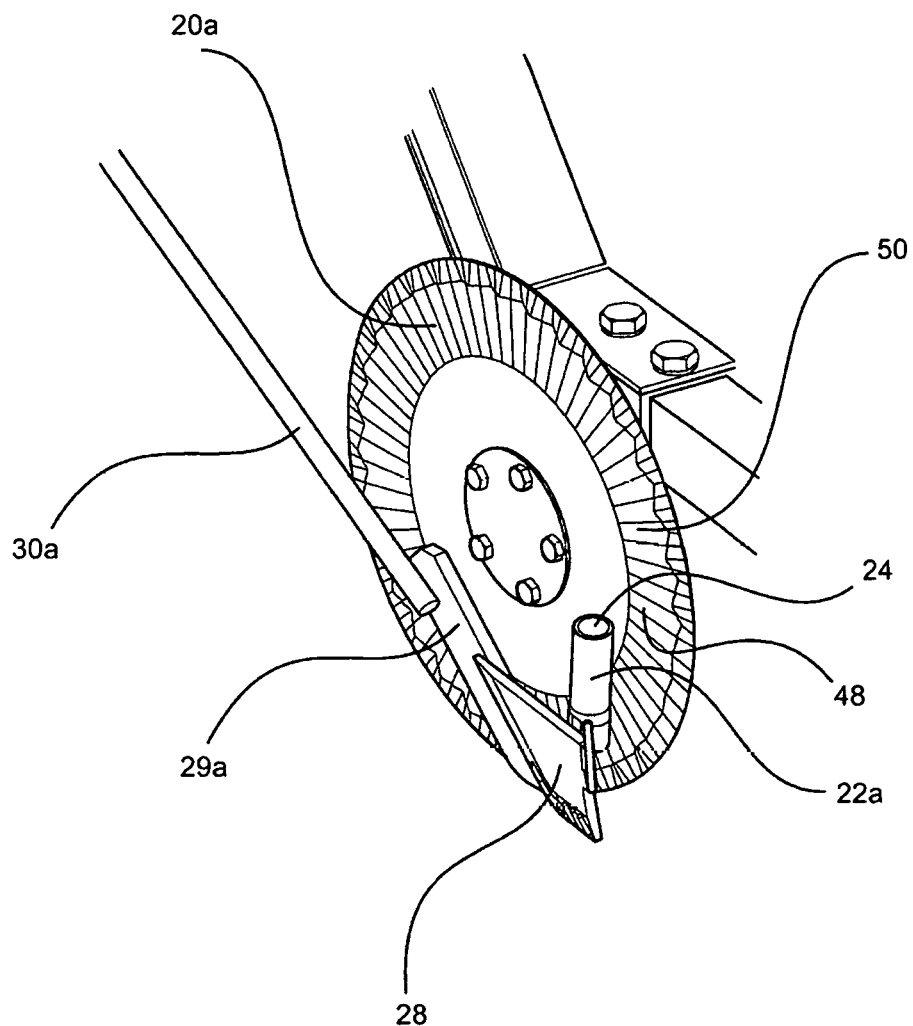
FIG. 5 is a perspective side view of the left side cutting and seeding assembly according to the first embodiment of the invention
Figure 6:
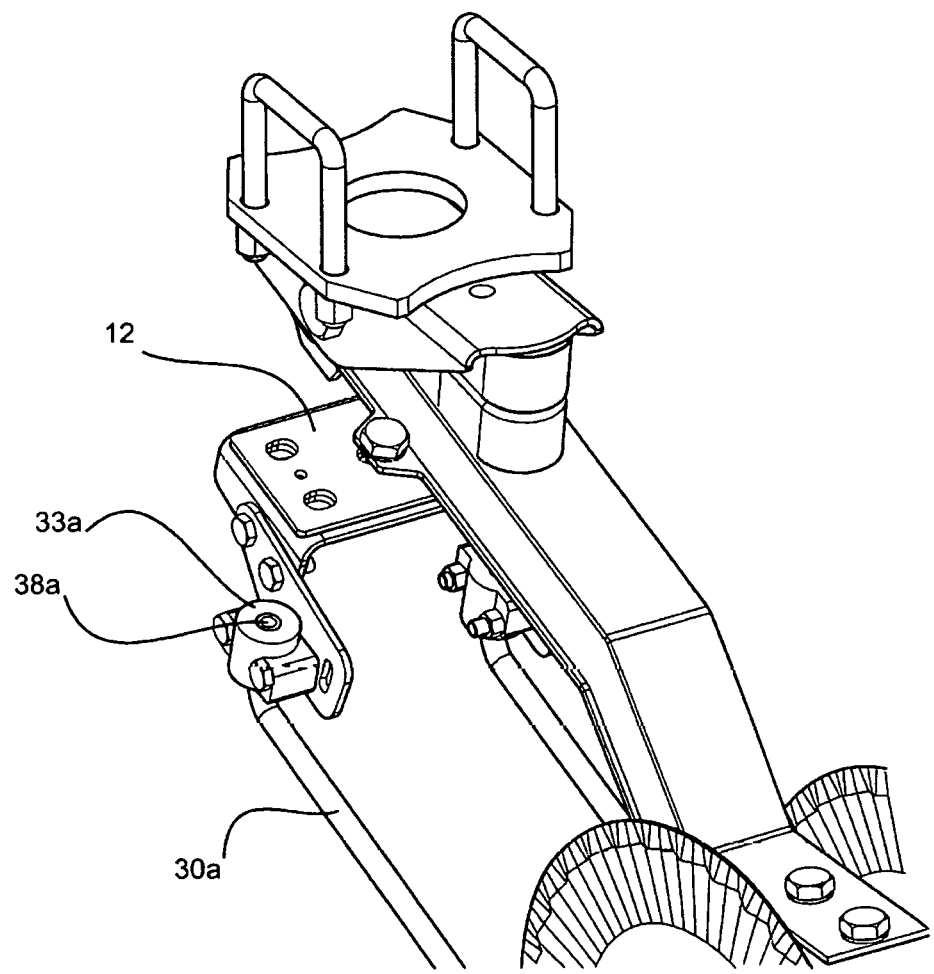
FIG. 6 is a perspective rear view of the left side of the front section of the seeding apparatus shown in FIG. 1.
Figure 7:
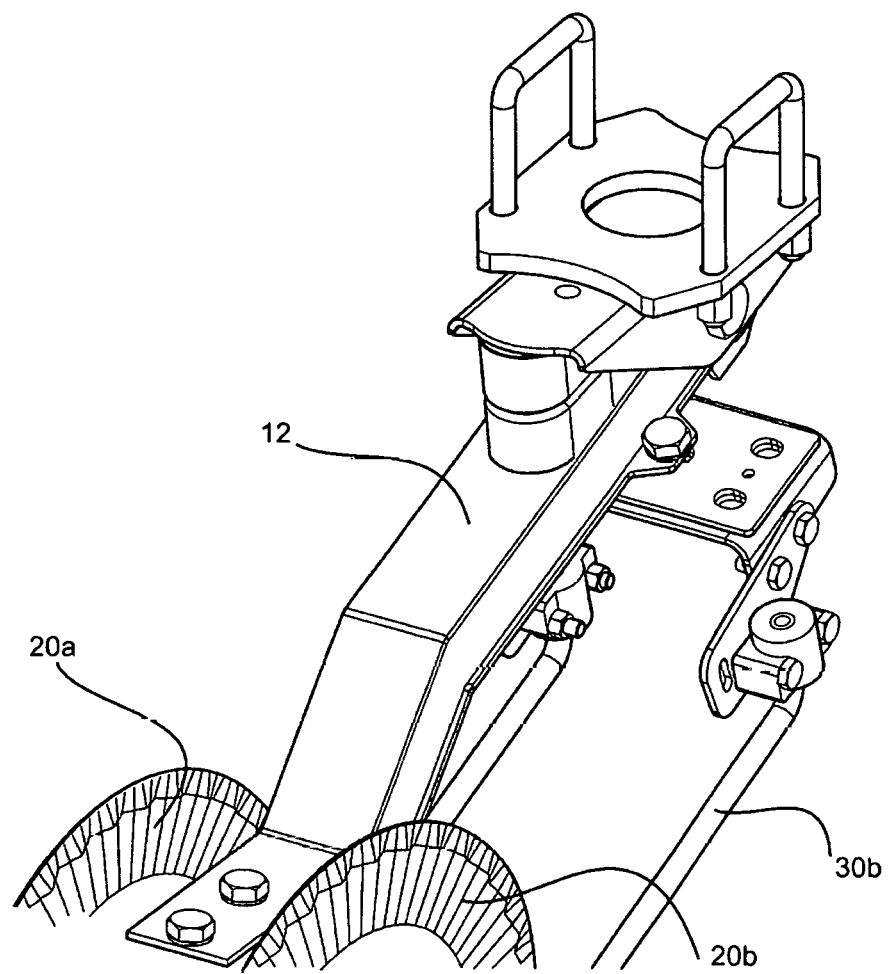
FIG. 7 is a perspective rear view of the right side of the front section of the seeding apparatus shown in FIG. 1.

Referring now to FIGS. 3 to 5.

As shown in FIG. 3, the seed boot 22a is attached to a seed boot mounting 31 comprising a bar 30a configured for locating the seed boot 22a adjacent the cutting disc 20a.

The bar 30a comprises a distal end 32a having a plate 34a for attaching the seed boot 22a to the distal end 32a of the bar 30a.

Further, the bar 30a comprises a proximal end 36a that is attached to the frame 11 of the seeding apparatus 10. In the particular arrangement shown in the FIGS. 1 to 8 the proximal end 36a is attached to the font section 12 of the frame 11 of the seeding apparatus 10. In accordance with alternative arrangements, the proximal end 36a may be attached to any location of the seeding apparatus 10. In particular, the proximal end 36a of the bar 30 is attached to any locations of the seeding apparatus 10 for permitting lateral displacement of the distal end 32a of the bar 30a away from the discs 20a increasing the distance between the seed boot and the disc 20a.

Further, the proximal end 36a is pivotally attached to a particular location 33a of the frame 11 of the seeding apparatus 10. To permit pivotal movement of the bar 30a, there is provided a pivot joint 38a at the particular location of the front section 12 for pivotally attaching the proximal end 36a of the bar 30a to the particular location of the frame 11 of the seeding apparatus 10. In a particular arrangement, the pivot joint 38a comprises torsional spring means comprising flexible material such as rubber.

The fact that the bar 30a is pivotally attached to the frame 11 of the seeding apparatus 10 is particular advantageous because it permits separating the seed boot 22a from the cutting disc 20a creating a large enough gap for, for example, removing any debris that may be trapped between the disc 20a and the seed boot 22. In accordance with the present embodiment of the invention, the bar 30a may move sideways (lateral movement) separating the seed boot 22a from the cutting disc 20a. Due to the fact that the pivot joint 38a comprises torsional spring means comprising flexible material such as rubber, the bar 30a may move vertically— this is particularly advantageous if a rock or other obstruction is intercepted by the seeding unit 21. The combination of lateral and vertical oscillation also helps to prevent blockages between the boot and the disc.

The pivot joint 38a may be biased in such a manner that the seed boot 22a is maintained adjacent the cutting disc 20a unless a force is applied to the seed boot 22a (such as a pulling force applied to, for example, the seed boot 22a) to separate the seed boot 22a from the disc 20a.

The previous paragraph described the cutting and seeding assembly 16a located on the left side of the seeding apparatus 10 and that is shown in FIGS. 3 and 5. FIG. 4 depicts the cutting and seeding assembly 16b located on the right side of the seeding apparatus 10. The cutting and seeding assembly 16b is substantially identical to the cutting and seeding assembly 16a; however, as shown in FIG. 4, in the cutting and seeding assembly 16b, the seed boot 22b is located adjacent the inner side of the cutting disc 20b. And, as show in FIG. 7, the seed boot 22b is attached through a bar 30b that is (as is the bar 30a) pivotally attached through a pivot joint to a particular location of the frame 11 of the seeding apparatus 10.

Referring now to FIG. 5, it was mentioned before that the seed boots 22 are attached to the distal end of the bars 30. In accordance with the present embodiments of the invention, the seed boots 22 are attached to the distal end of the bar 30a through scrapers 29.

The scrapers 29 are attached to the distal ends of the bars 30 in such a manner that at least a portion of the scrapers 29 abuts the side surface of the cutting discs for scraping of the side surface of the cutting discs during rotation of the cutting discs.

Referring now back to FIG. 1.

It was mentioned earlier that the seeding apparatus 10, in accordance with the first embodiment of the invention, comprises a trailing press wheel assembly 18 that is attached to the rear section 14 of the seeding apparatus 10. The press wheel assembly 18 and the cutting and seeding assemblies 16 are arranged in a tandem arrangement. In particular, as shown in FIG. 1, the press wheel assembly 18 is attached to the seeding apparatus 10 in such a manner that the press wheel assembly 18 may be located behind the cutting and seeding assemblies 16. This permits the wheel assembly 18 to close and pack the furrow after the seeds have been deposited inside the furrow.

Further, the trailing press wheel assembly 18 comprises two wheels 40a and 40b that are arranged side by side. In this arrangement, the wheel 40a is located behind the cutting and seeding assembly 16a and the wheel 40b is located behind the cutting and seeding assembly 16b. Thus, in this particular arrangement, a single cutting disc 20 is followed by a single packing press wheel 40.

In accordance with the present embodiment of the invention, the trailing press wheel assembly 18 is adapted to set the depth of the cutting discs 20 with respect to the soil of the field to be sowed. For this, the trailing press wheel assembly 18 is attached to the rear section 21 of the seeding apparatus 10 in such a manner that the height of the trailing press wheel assembly 18 with respect to the height of the cutting disc may be varied. Varying the height of the trailing press wheel assembly 18 allows varying the height of the cutting discs 20 and thus controlling the depth of the furrow.

Furthermore, the fact that the disc 20 is arranged in tandem arrangement with respect to the press wheel assembly is particularly advantageous because it permits the wheel(s) (of the press wheel assembly) to run in the slot created by the disc and in direct line with the disc 20. The advantage of this particular arrangement is that if the soil comprises a high point (such as protrusion in the soil), the disc 20 cuts straight through the high point without the cutting and seeding unit 16 being lifted; this permits displacing sideways of the high point leaving an open and level furrow which the press wheel 40 then passes through without rising as the high point has been removed by the disc 20. The result is more consistent seed depth.

In accordance with the first embodiment of the invention, there is provided a height adjustment mechanism for selectively varying the height of the press wheel assembly 18.

Figure 8:
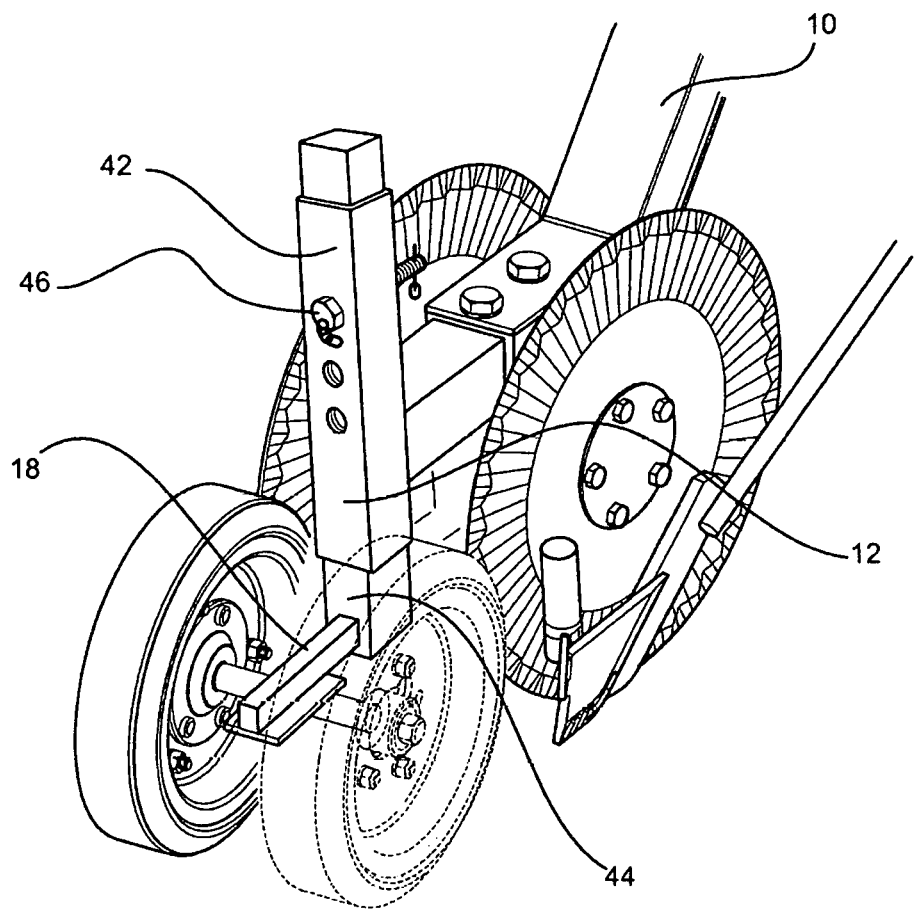
FIG. 8 is a perspective rear view of the seeding apparatus shown in FIG. 1 depicting the right cutting and seeding unit.

FIG. 8 shows the rear section 12 of the seeding apparatus 10 having attached thereto the press wheel assembly 18 so that the height of the press wheel assembly 18 may be varied.

A particular arrangement of the height adjustment mechanism is shown in FIG. 8. As depicted in FIG. 8, the rear section 12 of the seeding apparatus 10 comprises a sleeve 42 adapted to slideably receive a rod 44 of the wheel assembly 18. The fact that the rod 44 is adapted to be slideably received within the sleeve 42 of the rear section 12 of the seeding apparatus 10 permits varying the height of the press wheel assembly 18 with respect to the rear section of the seeding apparatus 10. Varying the height of the press wheel assembly 18 allows selective variation of the height of the cutting discs 20, controlling the depth of the furrow to be formed.

The rod 44 may be fastened at a particular location within the sleeve 42. In the particular arrangement shown in the figures, the sleeve 42 and the rod 44 comprise openings arranged in a spaced apart relationship along the longitudinal axes of the sleeve 42 and the rod 44. This arrangement permits a pin 46 to traverse the sleeve 42 and the rod 44 so as to secure the rear section 12 at particular locations. To form a furrow of a desired depth, the rod 44 may be slid to a particular location within the sleeve 42 and fastened at that particular location by traversing the pin 46 through the openings of the sleeve 42 and the rod 44.

It is particularly advantageous that the press wheel assembly 18 sets the depth of the cutting discs 20. Having the press wheel assembly 18 to set the depth of the cutting discs 20 avoids the need for a gauge wheel as used in the conventional seeding apparatus.

In conventional seeding apparatus, a gauge wheel runs alongside the cutting discs to set the depth of the cutting discs. The presence of gauge wheel allows mud blockages to build up. Also, gauge wheels require continuous maintenance; thus, omission of the gauge wheel eliminates mud blockages and the wear and tear of the extra components that are required when using a gauge wheel.

A core element of the difference between (1) using the press wheel (as is the case in accordance with the present embodiments of the invention) to control the depth and (2) using the gauge wheels (as is the case in conventional seeding apparatus) is that when using the gauge wheel the depth of the seed is set relative to the undisturbed soil (on which the gauge wheel runs on), whereas the depth in accordance with the present embodiments of the invention is set relative to the furrow. So with a gauge wheel, variations in the height of the furrow relative to the undisturbed soil will affect the seed depth, whereas in accordance with the present embodiments of the invention the depth below the furrow surface is correct regardless of the height of the furrow relative to the undisturbed soil.

Furthermore, in conventional seeding apparatus the press wheel (if present) is under spring pressure only; this is because the gauge wheel takes the full weight of the conventional seeding apparatus, and the press wheel follows the surface of the furrow under spring pressure.

In contrast, in the seeding apparatus 10 in accordance with the present embodiment of the invention, the press wheel assembly 18 and the cutting discs 20 take at least a portion of the weight of the seeding apparatus 10; this is because the gauge wheel has been omitted in the seeding apparatus 10 in accordance with the present embodiment of the invention.

The fact that the press wheel assembly 18 takes at least a portion of the downforce force produced by the weight of the seeding apparatus 10 permits a very effective packing of the soil around the deposited seeds by the wheels of the press wheel assembly 18. This results in improved crop establishment compared to the poorly packed furrow that can result by using conventional seeding apparatus wherein the press wheel relies on spring pressure only.

Further, the seeding apparatus 10 in accordance with the first embodiment of the invention allows, during the seeding process, implementation of a technique known as "chasing moisture". In this particular technique, the seed is placed deep in the soil profile, with the top of the furrow formed when the press wheel assembly 18 is set a distance below ground height, meaning that the seeds are still deposited at the correct depth relative to the surface of the furrow but planted into the deeper moist soil. This is particularly advantageous because it permits forming a relatively deep furrow; this is in sharp contrast with conventional disc seeding units which by nature of their design are typically unable to create a relative deep furrow.

Another advantage of the seeding apparatus 10 in accordance with the present embodiment of the invention is that in non-wetting (hydrophobic) soils (that are frequent in Australia) the seeding apparatus 10 throws the dry surface soil out of the furrow and onto the "interrow" (the undisturbed soil between the furrows). This practice has been scientifically proven to significantly improve crop germination and yield in rainfall constrained environments. As will be explained at a later stage this advantage is due to the combination of the fact that the cutting disc 20 comprise rippled discs, and the absence of a gauge wheel which would otherwise prevent the top soil from being displaced to the interrow.

A second important advantage of the soil displacement achieved (by the combination of a rippled disc and no gauge wheel) compared with conventional seeding apparatus 10 is that it greatly improves both the efficacy and crop safety of pre-emergent herbicides. Pre-emergent herbicides such as Trifluralin require being covered by a layer of soil to prevent them from volatilising into the atmosphere. They are also toxic to crop plants if placed in the seedbed with the seeds. The action of the rippled disc in removing topsoil from the furrow and placing it on the interrow has two large advantages: firstly, it covers the chemical with soil which makes the chemical more effective at killing weeds between the crop rows, and secondly, it removes the chemical from the crop row which minimises the risk of chemical toxicity to the crop. Gauge wheels in particular capture the disturbed soil and mix it back into the furrow amongst the crop seeds.

Moreover, another advantage of the seeding apparatus 10 in accordance with the present embodiment of the invention is that the cutting discs 20 cut through any small surface variations maintaining the press wheel assembly 18 at the correct height relative to seed depth.

Referring now back to FIG. 2.

FIG. 2 are rear views of the cutting discs 20 depicting the edges of the cutting discs 20. The cutting discs 20 in accordance with the present embodiment of the invention include uneven side surfaces. In particular, the cutting discs 20 comprise a plurality of ripples 50 that are arranged in a spaced apart relationship around the outer side of the disc 20a. Each of the ripples 50 extend partially from the circumference of the disc 20 radially toward the center of the disc 20. These types of discs 20 are referred to as rippled discs.

Figure 9:
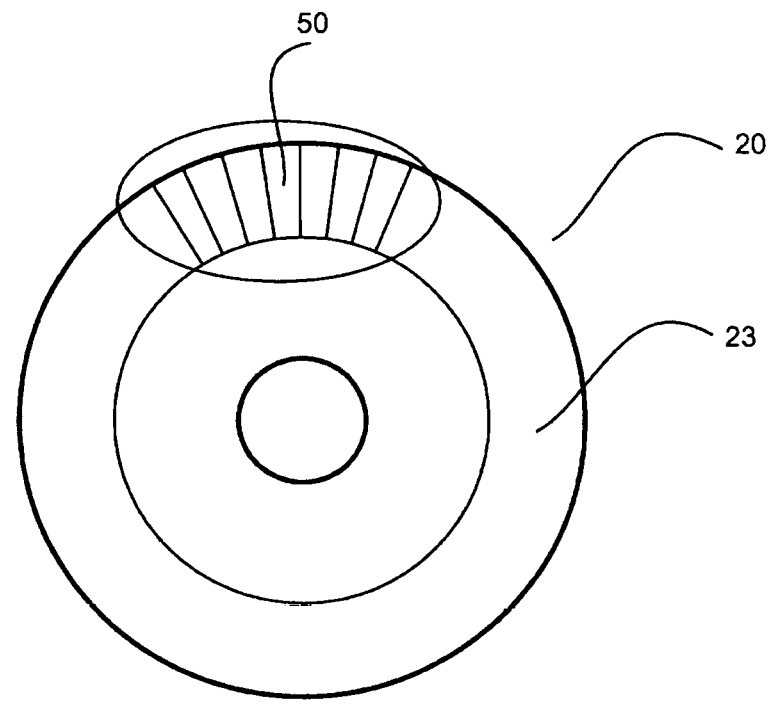
FIG. 9 is a schematic side view of a particular arrangement of a disc of the seeding apparatus shown in FIG. 1.
Figure 10:
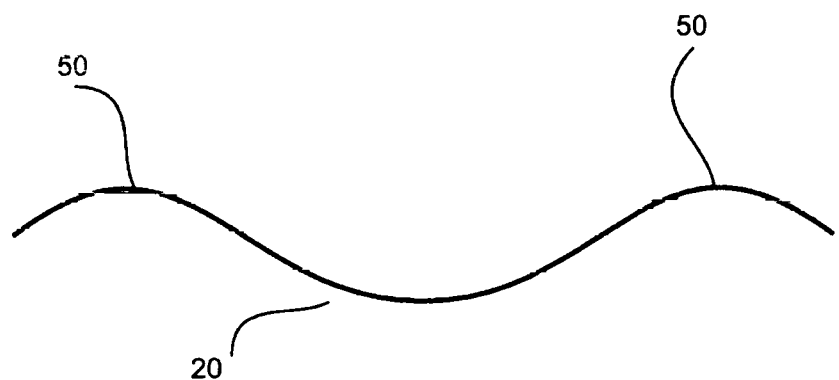
FIG. 10 is a schematic top view of a particular section of the disc shown in FIG. 9.

FIGS. 9 and 10 show a particular arrangement of a disc 20. FIGS. 9 and 10 are schematic only; for example, FIG. 9 shows the outer periphery 23 of the disc 20 having ripples 50 along a particular arc section of the disc 20; however, in particular arrangements, the outer periphery 23 of the disc comprises a plurality of ripples 50 that extend along the entire periphery 23 of the disc 20.

As shown in FIG. 9, this particular arrangement of disc 20 comprises an outer diameter of about 460 mm. The disc 20 comprises an exterior periphery 23 having a width of about 80 mm. The exterior periphery 23 comprises a rippled surface defining the ripples 50. As shown in FIG. 10, the height of each ripple 50 is about 6 mm.

The fact that the cutting discs 20 are rippled discs is particularly advantageous. This is because a rippled disc is able to throw more soil onto the interrow, which is essential for many modern pre-emergent herbicides to work effectively, particularly Trifluralin. By corollary, it also removes chemical treated soil more effectively from the furrow, resulting in substantially better crop germination. Seedling death from chemical toxicity is one of the biggest single issues with conventional single discs in modern chemical farming systems.

Further, the inclusion of ripples 50 in the cutting discs 20 is particularly advantageous. This is because a flat disc (a disc with even side surfaces) becomes blunt relatively quickly when running at an angle through the soil while forming the furrow. In contrast, due to constant change in direction as the rippled cutting discs 20 travel through the soil, a self-sharpening effect is produced that keeps the cutting discs 20 sharpened. This results in a large reduction in the issue of "hairpinning" which is caused by a blunt disc pushing surface straw, chemicals and residue into the furrow, resulting in poor seed-soil contact and consequently poor crop establishment.

As mentioned earlier, the ripples 50 also generate a comparatively increased rotational driving force by friction with the soil which helps to prevent them from stalling.

Furthermore, the combined effect of the rippled configuration of the disc 20 and the absence of a gauge wheel adjacent to the disc 20 discourages mud blockages; as mentioned before, in conventional seeders the presence of a gauge wheel located on the side of the cutting disc prevents lateral movement of soil onto the interrow away from the disc 20.

Figure 11:
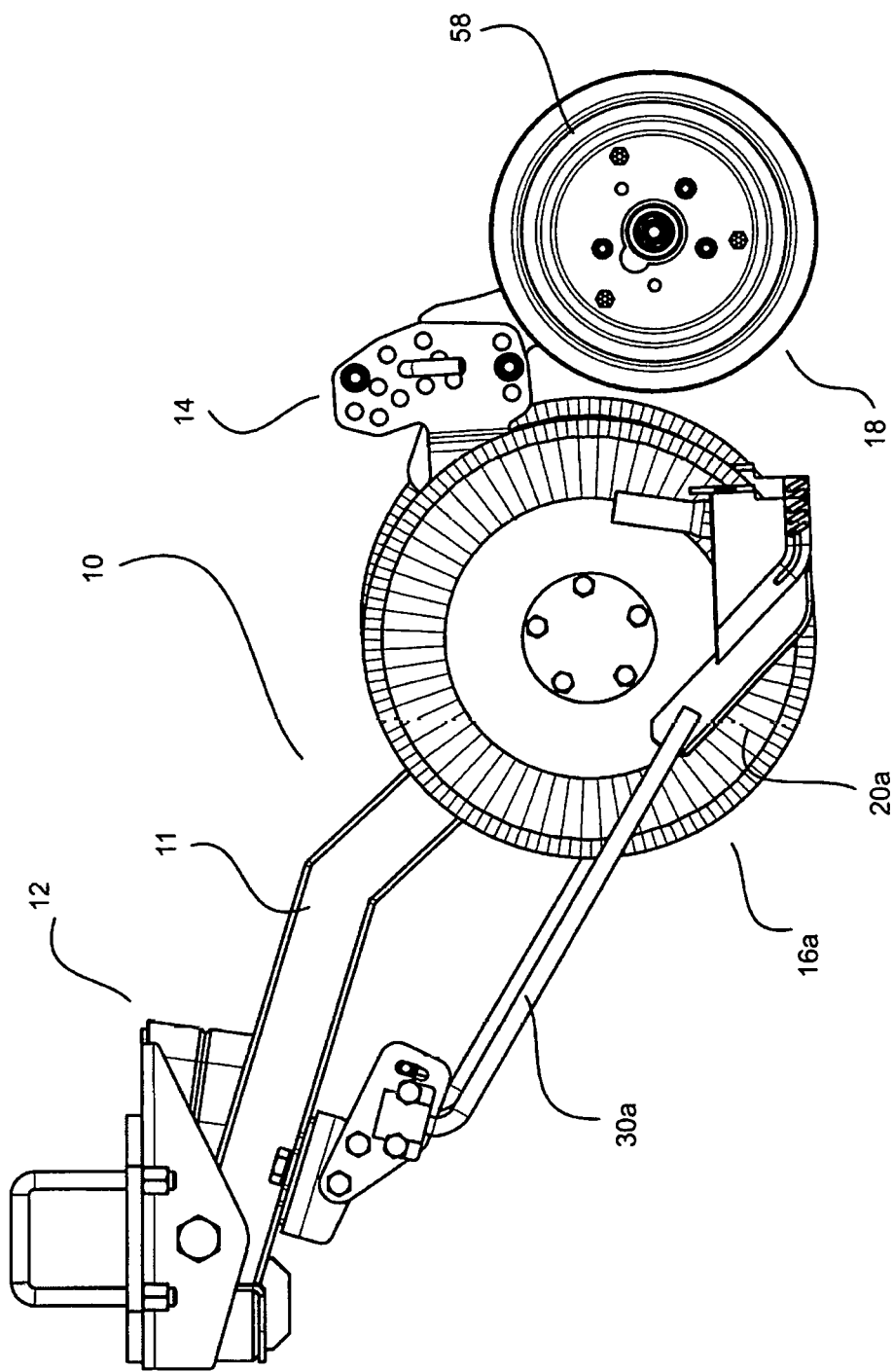
FIG. 11 is a left side view of a seeding apparatus according to the second embodiment of the invention.
Figure 12:
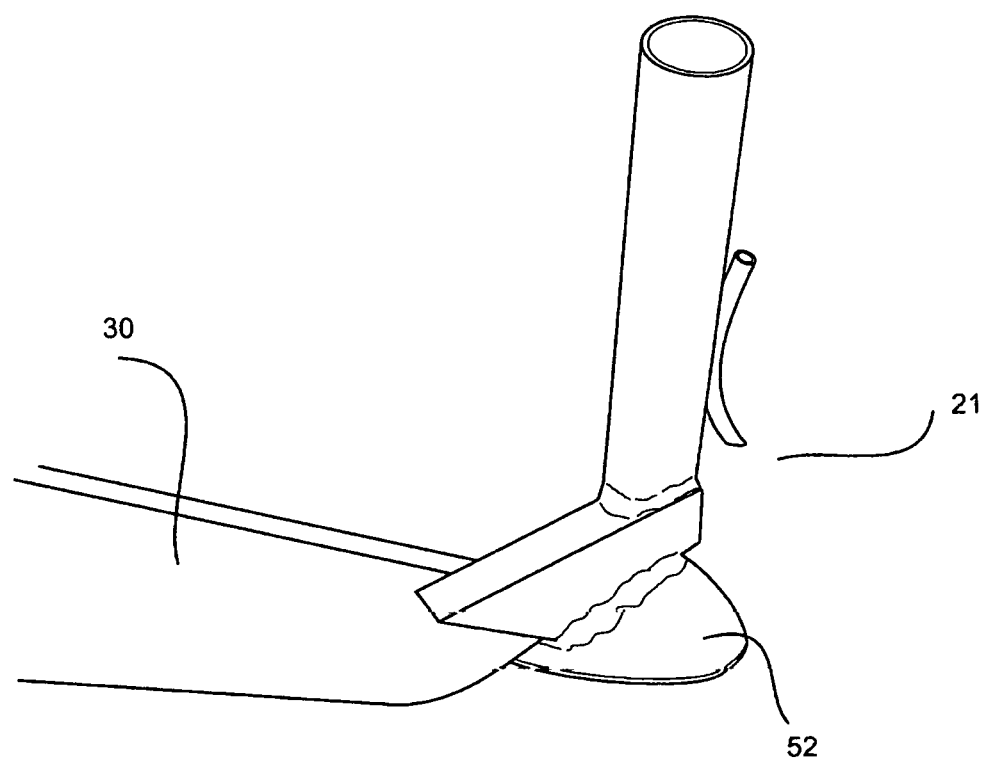
FIG. 12 is perspective view of the seed boot assembly according to the second embodiment of the invention.
Figure 13:
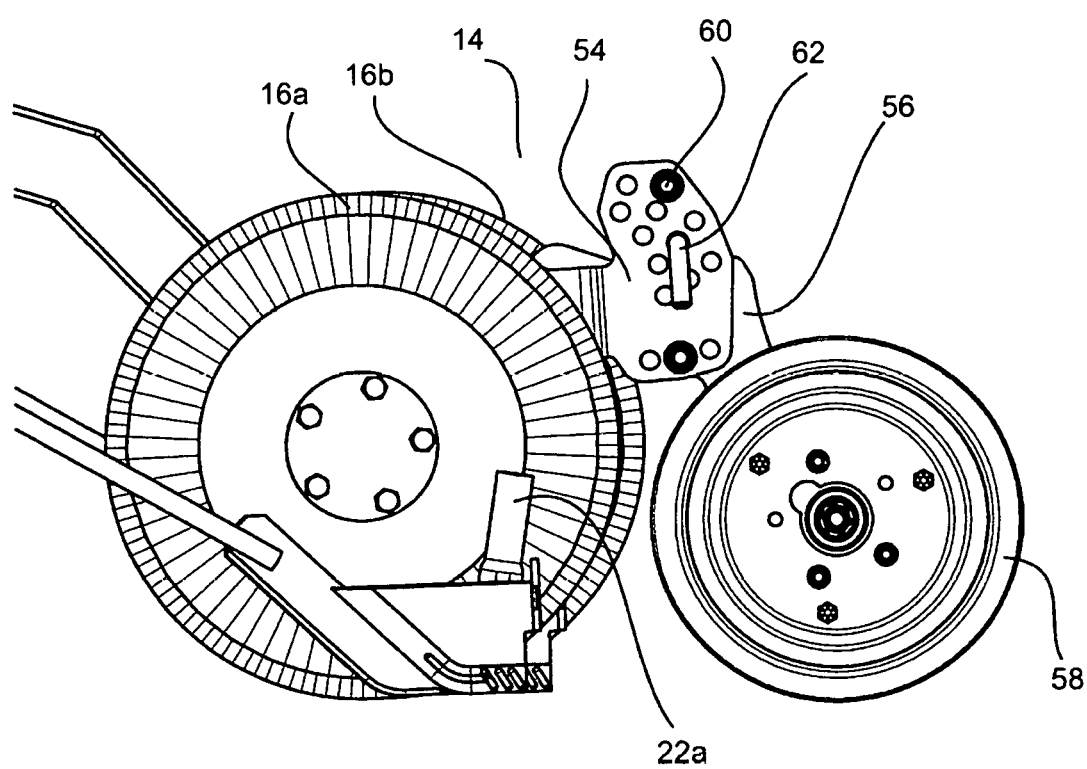
FIG. 13 is a left side view of the rear section of the seeding apparatus shown in FIG. 11.

Referring now to FIGS. 11 to 13.

FIGS. 11 to 13 depict a particular arrangement of a seeding apparatus 10 in accordance with a second embodiment of the invention. The seeding apparatus 10 according to the second embodiment is similar to the seeding apparatus 10 according to the apparatus of the first embodiment and similar reference numerals are used to identify similar parts.

The seeding apparatus 10 shown in FIG. 11 comprises a frame 11 having a front section 12 and a rear section 14. The front section 12 is adapted to be attached to a toolbar of seeder.

The rear section 14 comprises the cutting and seeding assemblies 16 and a trailing press wheel assembly 18. The cutting and seeding assemblies 16 and the trailing press wheel assembly 18 are arranged in tandem arrangement. As can be appreciated from the figures, the cutting and seeding assemblies 16a and 16b are located side by side and are substantially identical to the cutting and seeding assemblies 16 in accordance with the first embodiment of the invention except for, for example, the configuration of the seeding unit 21 depicted in FIG. 12.

As shown in FIG. 12, the seeding unit 21 comprises a wing member 52 attached to the lower end of the seed boot 22 and extending perpendicularly from the seed boot 21 such that when the see boot 22 is adjacent the disc 20, as shown in FIG. 11, the wing member extends perpendicular to the disc 20. The presence of the wing member 52 creates, during formation of the furrow by the disc 20, a wider furrow and also removes residues from the furrow to ensure improved establishment of the seed and future plant. In a particular arrangement, the seeding unit 12 may comprise a rearward sloping leading edge and/or a wing member 52.

Further, the seeding apparatus 10 shown in FIG. 13, comprises a particular arrangement of a press wheel assembly 18 in accordance with the second embodiment of the invention.

As shown in FIG. 13, the press wheel assembly 18 comprises a plate 54 that is attached to the rear section 14 of the seeding apparatus 10; the plate 54 comprises a plurality of holes 64 arranged in a spaced apart relationship with respect to each other.

Further, the press wheel assembly 18 comprises a swing arm 56 and a wheel 58. The swing arm 56 comprises one end that is pivotally attached to the plate 54 and another end for rotatably attaching the wheel 58. Pivotal attachment of the swing arm 56 occurs via pivot joint 60 located at the upper location of the plate 54. The swing arm 56 comprises a hole for securing the swing arm 56 at a particular location with respect to the plate 54 as shown in FIGS. 11 and 13.

Furthermore, the swing arm 56 may be fastened at particular locations of the plate 54; fastening occurs via a pin 62 traversing the hole of the swing arm at any of the holes of the plate 54. By selectively traversing the pin 62 through particular holes of the plate 54 for fastening of the swing arm to 56 to the plate 54 it is possible to selectively vary the location of the swing arm 56 with respect to the plate 54. Varying the location of the swing member 56 of the swing arm 56 permits setting the depth of the cutting discs 20 with respect to the soil of the field to be sowed; this permits controlling the depth of the furrow formed by the cutting discs 20 during operation of the seeding apparatus 10.

FIGS. 11 and 13 show a particular arrangement of a press wheel assembly 18 in accordance with the second embodiment of the invention having one press wheel 58; in accordance with alternative arrangements, there may be provided a plurality of swing arms 56, each swing arm 56 being pivotally attached to a plate 54 of a plurality of plates 54, and a plurality of wheels 58, each of the wheels 58 being rotatably attached to one swing arm, and wherein each of the wheels 58 is arranged in tandem relationship with respect to one of the cutting and seeding assemblies 16.

Modifications and variations as would be apparent to a skilled addressee are deemed to be within the scope of the present invention.

Further, it should be appreciated that the scope of the invention is not limited to the scope of the embodiments disclosed. In fact, the seeding apparatus in accordance with the first and second embodiment of the invention has been described as having a plurality of cutting unit and a seeding unit; however, in accordance with other embodiments of the invention the seeding apparatus may include only one cutting unit and a seeding unit; in this case the press wheel assembly may incorporate one press wheel 40 (or 58) in tandem arrangement with the one cutting unit and a seeding unit.

Further, the seeding apparatus in accordance with the first and second embodiment of the invention has been described as having one or more bars 30 with their proximal end 36 attached to a location of the frame of the seeding apparatus; however, in accordance with other embodiments of the invention the seeding apparatus may comprise one or more bar with their proximal end 36 attached to any location distal from the cutting disc(s) 20—for example, the proximal ends may be attached to the toolbar of the seeder incorporating the seeding apparatus 10.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A seeding apparatus comprising a frame having a first section adapted to be attached to a toolbar for towing by a vehicle, and a second section comprising:
   a cutting unit and a press wheel assembly, the cutting unit and press wheel assembly being attached to the second section in a spaced apart relationship with respect to each other along the second section arranged in a tandem relationship with respect to each other such that the press wheel assembly is trailing the cutting unit, and
   a seeding unit for location adjacent the second section of the frame,
   the cutting unit comprising at least one cutting disc and the seeding unit comprising at least one seed boot and at least one seed boot mounting,
   the seed boot mounting comprising a bar configured to locate the seed boot adjacent a side surface of the cutting disc,
   wherein the bar comprises a proximal end attached to the first section of the frame of the seeding apparatus, and a distal end for attachment of the seed boot.

2. A seeding apparatus according to claim 1 wherein the seeding apparatus comprises a pivot joint for pivotally attaching the proximal end of the bar to the first section of the frame of the seeding apparatus.

3. A seeding apparatus according to claim 2 wherein the pivot joint is biased in such a manner that the seed boot is maintained adjacent the side surface of the cutting disc unless a force is applied to the seed boot to separate the seed boot from the side surface of the disc.

4. A seeding apparatus according to claim 2 wherein the pivot joint is adapted to permit lateral and vertical movement of the bar.

5. A seeding apparatus according to claim 1 wherein the bar is adapted to allow selective displacement of the seed boot between a location separated from the cutting disc and a location adjacent the cutting disc.

6. A seeding apparatus according to claim 1 wherein the distal end of the bar comprises a scraper for attachment of the seed boot to the bar, the seed boot comprising a seed tube for delivery of the seed, wherein the seed tube is attached to the scraper.

7. A seeding apparatus according to claim 6 wherein the scraper is attached to the distal end of the bar in such a manner that a portion of the scraper abuts the side surface of the cutting disc for scraping of the side surface during rotation of the cutting disc.

8. A seeding apparatus according to claim 1 wherein the seed boot comprises a rearward sloping leading edge and/or wing member attached to a lower end of the seed boot and extending perpendicularly thereto.

9. A seeding apparatus according to claim 1 wherein the cutting disc is running at a particular angle to the direction of travel, the particular angle comprising values of within a range of between 5 and 9 degrees.

10. A seeding apparatus according to claim 1 wherein the seeding apparatus comprises two cutting units and two seeding units; in particular, there are a first cutting unit and a first seeding unit, and a second cutting unit and a second seeding unit, the first cutting unit comprises a first cutting disc and the first seeding unit comprising a first seed boot and a first seed boot mounting wherein the first seed boot of the first seeding unit is located adjacent an outer side surface of the first cutting disc, and the second cutting unit comprises a second cutting disc and the second seeding unit comprising a second seed boot and a second seed boot mounting wherein the second seed boot of the second seeding unit is located adjacent an inner side surface of the second cutting disc.

11. A seeding apparatus according to claim 10 wherein the first cutting unit and first seeding unit, and the second cutting unit and second seeding unit are located side by side.

12. A seeding apparatus according to claim 11 wherein the spacing between cutting discs is between 180 mm to 310 mm.

13. A seeding apparatus according to claim 10 wherein each cutting disc is rotatably attached to an individual hub.

14. A seeding apparatus according to claim 10 wherein the second seed boot mounting comprises another bar comprising a proximal end attached to a second location of the frame of the seeding apparatus and a distal end for attachment of the second seed boot.

15. A seeding apparatus according to claim 1 wherein at least one cutting disc comprises a rippled cutting disc.

16. A seeding apparatus according to claim 1 wherein the second section of the seeding apparatus is adapted to attach the press wheel assembly in such a manner that the height of the press wheel assembly with respect to the height of the disc may be varied.

17. A seeding apparatus according to claim 16, wherein the seeding apparatus comprises a height adjustment mechanism for selectively varying the height of the press wheel assembly.

18. A cutting and seeding assembly having a cutting unit and a seeding unit, the cutting and seeding assembly being adapted to be mounted on a seeding apparatus comprising a frame having a first section adapted to receive the seeding unit and adapted to be attached to a toolbar for towing by a vehicle, and a second section adapted to receive the cutting unit and a press wheel assembly arranged in tandem arrangement and attached with respect to each other such that the press wheel assembly is trailing the cutting unit, and the seeding unit being adapted for location adjacent the second section of the frame,
the cutting unit comprising a cutting disc adapted to be rotatably attached to the frame of the seeding apparatus and the seeding unit comprising a seed boot and a seed boot mounting,
the seed boot mounting comprising a bar configured to locate the seed boot adjacent a side surface of the cutting disc,
wherein the bar comprises a proximal end being adapted to be attached to the first section of the frame of the seeding apparatus, and a distal end for attachment of the seed boot.

19. A cutting and seeding assembly according to claim 18 wherein the proximal end of the bar is adapted to be pivotally attached via a pivot joint to the first section of the frame of the seeding apparatus to allow selective displacement of the seed boot between a location separated from the cutting disc and a location adjacent the cutting disc.

20. A cutting and seeding assembly according to claim 18 wherein the bar is adapted to allow selective displacement of the seed boot between a location separated from the cutting disc and a location adjacent the cutting disc.

21. The seeding apparatus according to claim 1, wherein the proximal end of the bar is pivotally attached to the frame of the seeding apparatus to allow selective displacement of the seed boot between a location separated from the cutting disc and a location adjacent the cutting disc.

22. The seeding apparatus according to claim 9, wherein the particular angle is seven degrees.

23. The seeding apparatus according to claim 14, wherein the second seed boot of the second seeding unit is located adjacent an inner side surface of the second cutting disc.

24. The seeding apparatus according to claim 19, wherein the pivot joint is adapted to permit lateral and vertical movement of the bar.

25. A cutting and seeding assembly according to claim 18, wherein the distal end of the bar comprises a scraper for attachment of the seed boot to the bar, the seed boot comprising a seed tube for delivery of the seed, wherein the seed tube is attached to the scraper.

26. A cutting and seeding assembly according to claim 18 wherein the cutting disc comprises a rippled cutting disc.

27. A cutting and seeding assembly according to claim 18 wherein the seed boot comprises a rearward sloping leading edge and/or wing member attached to a lower end of the seed boot and extending perpendicularly thereto.

28. A cutting and seeding assembly according to claim 18 wherein the cutting disc is running at a particular angle to the direction of travel, the particular angle comprising values of within a range of between 5 and 9 degrees.

29. A seeding apparatus according to claim 28 wherein the particular angle is seven degrees.

* * * * *